United States Patent [19]

Dwivedi et al.

[11] 4,304,794
[45] Dec. 8, 1981

[54] ARTIFICIAL-SWEETENER COMPOSITION AND PROCESS OF PREPARING AND USING SAME

[75] Inventors: Basant K. Dwivedi, Randolph; Prathivadibhayankaram S. Sampathkumar, Parsippany, both of N.J.

[73] Assignee: Chimicasa GmbH, Chur, Switzerland

[21] Appl. No.: 164,694

[22] Filed: Jun. 30, 1980

Related U.S. Application Data

[63] Continuation of Ser. No. 969,391, Dec. 14, 1978, abandoned.

[51] Int. Cl.$^3$ ............................................. A23L 1/236
[52] U.S. Cl. ................................... 426/548; 426/573; 426/575; 426/658; 426/657; 426/456; 426/804
[58] Field of Search ............... 426/548, 575, 573, 658, 426/656, 657, 456, 804

[56] References Cited

U.S. PATENT DOCUMENTS

| | | | |
|---|---|---|---|
| 2,311,235 | 2/1943 | Kuderman | 426/548 |
| 2,558,065 | 6/1951 | Tice | 426/576 X |
| 3,761,288 | 9/1973 | Glicksman et al. | 426/548 |
| 3,932,678 | 1/1976 | Rizzi | 426/658 X |
| 3,976,790 | 8/1976 | Crosby et al. | 426/548 X |
| 4,031,259 | 6/1977 | Lugay et al. | 426/548 |
| 4,153,737 | 5/1979 | Berg et al. | 426/548 |

*Primary Examiner*—Esther M. Kepplinger
*Attorney, Agent, or Firm*—Richard P. Crowley

[57] ABSTRACT

Artificial-sweetening compositions, useful as a low-calorie sweetening agent in the sweetening of foodstuff, and other low-calorie products are prepared by solubilizing 2,4,6,3'-tetrahydroxy-4'-methoxydihydrochalcone by combination and interaction of the water-insoluble dihydrochalcone with hydroxy-containing organic compounds, to provide water-soluble dihydrochalcone having enhanced sweetening power and improved aftertaste properties.

17 Claims, No Drawings

Upon completion of the admixing and heating, the artificial-sweetening compositions of the invention then may be employed in bulk as a crude mixture or may be separated, employing conventional separating techniques, such as fractional crystallization and the like. These compositions than may be employed as artificial-sweetening agents by incorporating the mixture in desirable amounts in food, beverages, confectionerys, chocolate products and the like, alone or in combination with natural or artificial sweeteners and other additives. Typically from about 0.0001% to 10%; for example, 0.001% to 0.05%, by weight of the artificial-sweetening compositions is employed as an additive-sweetening agent to edible products to effect sweetening; although the amount employed may vary as desired, based on the sweetening power desired.

In carrying out the reaction, it is often desirable to dissolve the THMDHC in alcohol, in order to incorporate it into or with the polyhydric alcohol or into or with a water/polyhydric-alcohol solution. The THMDHC may be dissolved easily in alcohol, such as ethanol, prior to being incorporated into the polyhydric alcohol or water/polyhydric-alcohol solution, with typically the THMDHC being employed in amounts up to about 20% by weight in the alcohol or water solution.

The particular nature of the novel artificial-sweetening composition of the invention is not fully known or understood. However, and not wishing to be bound by any particular theory, it may be that the THMDHC forms a reversible complex, or THMDHC and the polyhydric alcohol, when admixed, combine in some manner, such as an adduct, without a reaction.

The THMDHC, from which the artificial-sweetening composition is prepared, is the dihydrochalcone prepared from beta-neohesperidin dihydrochalcone by mild acid hydrolysis through known methods. The THMDHC is a well-known compound having the structural formula:

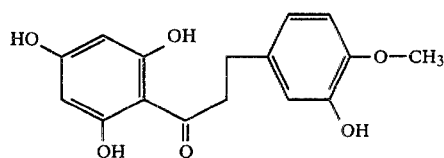

(I)

The pure compound of structure (I) is typically obtained by a process of crystallization.

The polyhydric alcohols useful in the preparation of the artificial-sweetening compositions of this invention are typically monomeric or polymeric alcohols having at least one functional hydroxyl group, but preferably two, three or more hydroxyl groups. The polyhydric alcohols employed may have from two to about one hundred carbon atoms in their molecular structure, but typically are monomeric or polymeric aliphatic polyhydric alcohols of from about three carbon atoms to thirty carbon atoms. Such polyhydric alcohols include, but are not limited to: propylene glycol, erythritol, pentaerythritol, sorbitol, mannitol, xylitol and polymeric polyols, such as the polyol glycerols represented by triglycerol, tetraglycerol, hexaglycerol, decaglycerol, pentaglycerol and the like, including isomeric forms and mixtures thereof. It has been found that the higher molecular weight and higher OH-content polyols, such as sorbitol, are most preferred in that the bitter aftertaste is avoided with such compounds. Such polyhydric alcohols typically have little sweetening, per se, in comparsion to sucrose. However, when employed in combination with the dihydrochalcone compounds of the invention, the artificial-sweetening composition with enhanced sweetening power is obtained.

Another preferred class of hydroxy compounds useful in the practice of the invention includes natural proteinaceous compounds containing amino and hydroxy groups, such as water-soluble, arabin-type gums, such as arabic gum and the like, which contain complex carbohydrates and which on hydrolysis yield sugar, while gelatin has been found to provide very water-soluble THMDHC sweetener compounds.

Suitable hydroxy carboxylic acids for use in the invention include lactic acid, maleic acid, tartaric acid, citric acid and similar water-soluble mono and polyhydroxy carboxylic aliphatic acids, as well as aminohydroxy carboxylic acids.

For the purpose of illustration only, the invention will be described in connection with certain embodiments and the process of making and using the invention, as well as the best mode contemplated by the inventors for carrying out the invention. However, it is recognized that persons skilled in the art may make various changes and modifications in the composition and process, without departing from the spirit and scope of the invention as described and claimed herein.

DESCRIPTION OF THE PREFERRED EMBODIMENTS

Example 1

A suitable reactor vessel is charged with 10 gms of triglycerol and 1000 mg of THMDHC. The charge is stirred and the resulting solution is heated to 95° C. for 20 minutes and then cooled to 20° C. The reaction product obtained is then dissolved in 10,000 milliliters of water. The aqueous solution is clear and colorless and has, based on the dry substance, twenty-five times the sweetening power of crystalline sugar and has no aftertaste. It is advantageously used for sweetening of foodstuffs and does not exhibit any damaging or unpleasant side effects, when employed in proportions of from 0.0001% to 5% by weight of the foodstuff.

Example 2

A suitable reactor vessel is charged with 10 gms of hexaglycerol and 1000 mgs of THMDHC. The charge is stirred and heated to a temperature of 95° C. for 18 minutes. At the end of this period, the resulting reaction mixture is allowed to cool to 25° C. The cooled mixture is then mixed with 8,000 ml of water to obtain an excellent solution, colorless, having a sweetness, based on dry basis, of twenty-five times the sweetening power of sugar, with no lingering aftertaste or other adverse taste.

Example 3

A suitable reactor vessel is charged with 10 gms of gelatin or arabic gum and 1000 mgs of THMDHC. The charge is stirred and the resulting solution is heated to about 100° C. to 110° C. for 15 to 20 minutes. It is then cooled to 20° C. The reaction product obtained is then dissolved in 10,000 milliliters of water. The aqueous solution is colorless, having a sweetness of about five times the sweetening power of a sucrose solution, with no lingering or bitter aftertaste.

ARTIFICIAL-SWEETENER COMPOSITION AND PROCESS OF PREPARING AND USING SAME

This is a continuation of application Ser. No. 969,391, filed Dec. 14, 1978, now abandoned.

BACKGROUND OF THE INVENTION

Artificial-sweetening compositions have been employed for imparting sweeteners to food, beverage, confectionery and other products, and more particularly artificial-sweetening agents and compositions have been used by persons affected by physiological disorders, such as diabetes mellitus, and by those persons who must restrict their caloric intake as part of a weight-control regimen. Artificial-sweetening agents are useful not only in food and beverages, but also are useful in certain oral and cosmetic compositions.

Sweetening and flavoring characteristics have been imparted to various compositions by the use of various synthetic sweeteners. The most commonly used artificial sweeteners are the compounds of saccharin. A number of dihydrochalcone glycosides and dihydrochalcones has been known to impart a sweet taste, such as, for example, as set forth in U.S. Pat. Nos. 3,087,871; 3,583,984; 3,974,299; 3,984,394; and 3,013,801. U.S. Pat. No. 3,976,790, which patent is hereby incorporated by reference in its entirety, in particular discloses that 2,4,6,3'-tetrahydroxy-4'-methoxydihydrochalcone (hereinafter referred to as THMDHC) is one of a group of dihydrochalcone compounds suitable for use as a sweetening agent in food products, but disclaims it as being so insoluble in water that a 0.009% solution would not be made up simply, and, thus, its usefulness as a sweetener would be minimal.

The dihydrochalcones appear to be nontoxic and potentially attractive as nonsugar-sweetening agents, especially because they are noncaloric, not having any insulin requirement. However, THMDHC has not proven to be satisfactory wholly, because of its insolubility in aqueous solutions and bitter aftertaste. In addition, many of the dihydrochalcones, especially 2,4,6,3'-tetrahydroxy-4'-methoxy dihydrochalcone, are insoluble in water, and other dihydrochalcones have limited or insufficient solubility in water, which limits their usefulness as artificial sweeteners in food, beverage and confectionery products.

Therefore, it would be desirable to provide an artificial-sweetening composition with enhanced sweetening power, with good water solubility and with no or minimum menthol or bitter aftertaste effects at the concentration level employed.

SUMMARY OF THE INVENTION

This invention relates to an artificial-sweetening compound derived from 2,4,6,3'-tetrahydroxy-4'-methoxydihydrochalcone (that is, THMDHC) and to a process of preparing such compound and the use of such compound as a sweetening agent in food, beverage and confectionery compositions.

This invention concerns water-soluble THMDHC compounds and the process of preparing such compounds by the combination or interaction of the THMDHC compounds with an organic compound which contains one or more electron-donating functioning groups, particularly amino and hydroxyl groups, to form physical adduct or interaction with the THMDHC or a reversible-type adduct or compound which is water-soluble. It has been found that such water-soluble compounds so prepared have greatly enhanced sweetness and reduced, minimal or no bitter aftertaste usually associated with dihydrochalcones from which the compounds are derived.

In particular, it has been discovered that highly water-soluble sweetener compositions can be prepared by the combination and/or interaction of hydroxy-containing organic compounds, particularly a polyhydroxy organic compound, such as polyols and polyhydric alcohols, with THMDHC. The organic compound typically should be alcohol and water-soluble and acceptable for use in food compositions. Suitable hydroxy compounds are represented by, but not limited to: water-soluble hydroxy-containing carbohydrates; sugar alcohols; amino acids; carboxylic acids; proteins and natural gums and their salts, alone or in combination. In the preferred embodiment, the sweetener compositions of this invention are prepared with polyols and polysaccharides, such as sorbitol, and with gelatin.

It has been found that the artificial-sweetening compositions of this invention, unlike the parent compound from which the compositions are derived, have useful and high water-soluble properties and may be dissolved easily in water. The preferred artificial-sweetening compositions of this invention also exhibit high degrees of sweetening power; for example, up to two hundred and fifty times the sweetness of natural sugar. Furthermore, unlike neohesperidin dihydrochalcone, the artificial-sweetening compositions of this invention lack the undesirable lingering aftertaste associated with the dihydrochalcone compounds from which the compositions are derived. The artificial-sweetening compositions of this invention have an intense sweetness and high water solubility, which are unexpected, in that THMDHC, from its chemical structure, would not be expected to go into solution in these compounds, and any mixture obtained from such combination is expected to separate upon mixing it in an aqueous solution. The intense sweetness of the combination of THMDHC and organic compounds; that is, sugars, polyhydric alcohols and amino acids, is also unexpected.

This invention relates also to the process of preparing the artificial-sweetening compositions, which process comprises the admixing together of the 2,4,6,3'-tetrahydroxy-4'-methoxydihydrochalcone with polyhydric alcohols. The admixture may take place in bulk or in the presence of a carrier liquid, such as water or an alcohol or water-and-alcohol solution of the compound. The artificial sweetener is prepared simply by admixing the polyhydric alcohols with the dihydrochalcones typically in proportions of from about 1 to 1000; for example, 5 to 500, parts by weight of the polyhydric-alcohol compounds for each part by weight of the THMDHC, and most preferably about 5 to 100 parts of the polyhydric alcohols to the THMDHC. The admixture is heated to a temperature generally within the range of from about 30° C. to 180° C., but preferably 40° C. to 120° C., such as, for example, 90° C. to 100° C., for a period of time until maximum solubility in water has been achieved by the admixture. Maximum solubility in water can be determined by taking and testing proportional aliquots of the admixture. Generally maximum solubility in water is obtained when the admixture has been heated within the above-described temperature ranges for periods of from about 5 to 60 minutes; for example, 15 to 40 minutes.

Example 4

The procedure of Example 1 (supra) was repeated a number of times with a variety of different polyol reactants in different proportions. The proportions of reactants, reaction temperatures, duration of heating, proportion of water in which dissolved, solubility achieved, sweetness level, color, aftertastes noted and other taste effects are shown in Table I. Unless otherwise specified, all parts are by weight. The dihydrochalcone or its salts are dissolved in water or in ethanol, if desired, and the polyol is added and the admixture is then heated to the temperature shown, until the water (or alcohol if present) is removed, dried under vacuum, powdered and then tasted for its properties. The sweetness results, set forth in Table II, are based on the sweetness of an aqueous solution of sucrose.

TABLE I

| EXPERIMENT NUMBER | QUANTITY OF AGLYCONE | POLYOL OR SUGAR-ALCOHOL | LIMIT OF POLYOL OR SUGAR-ALCOHOL | TEMP. RANGE | DURATION | AMOUNT OF WATER ml | SOLUBILITY |
|---|---|---|---|---|---|---|---|
| 1 | 100 mg to 1000 mg | Propylene glycol | 10 ml | 60–120° C. | 15–30 min. | 236 ml | Excellent |
| 2 | 100 mg to 1000 mg | Glycerol | 10 ml | 40–100° C. | 15 min. | 236 ml | Excellent - very easily soluble, clear solution |
| 3 | 50 mg to 1000 mg | Triglycerol | 10 ml | 60–140° C. | 15–30 min. | 236 ml | Very good - clear solution |
| 4 | 50 mg to 1000 mg | Hexaglycerol | 10 ml | 50–150° C. | 30–40 min. | 236 ml | Very good |
| 5 | 50 mg to 1000 mg | Decaglycerol | 10 ml | 50–160° C. | 30–45 min. | 236 ml | Very good |
| 6 | 10 mg to 1000 mg | Cooked sorbitol | 10 ml | 60–120° C. | 30–45 min. | (0.5 to 0.8 g) in 100 ml | Very good |
| 7 | 10 mg to 1000 mg | 70% Sorbitol | 10 ml | 60–140° C. | 30–45 min. | 0.8 g in 236 ml | Very good |
| 7 a | 200 mg | 70% Sorbitol | 10 ml | 60–140° C. | 30–45 min. | 1g/236 ml | Excellent |
| 8 | 10 mg to 1000 mg | Sorbitol (Solid) | 10 g | 60–180° C. | 30–45 min. | 1g/236 ml | Very good |
| 9 | 100 mg to 1000 mg | Ethanol | 10 ml | 25–50° C. | 10–15 min. | 236 ml | Poor - cloudiness Appears |

TABLE II

| EXPERIMENT NUMBER | INTENSITY OF SWEETNESS AGAINST SUGAR | COLOR OF REACTION PRODUCT | COLOR OF AQUEOUS SOLUTION OF THMDHC WITH SWEETNER 8% SUGAR | AFTERTASTE | SECONDARY EFFECTS OR ACTION |
|---|---|---|---|---|---|
| 1 | 2.5–50 | Light brown | Colorless | Bitter | Taste lingers in the mouth |
| 2 | 2.5–50 | Light brown | Colorless | Bitter | Persists for awhile |
| 3 | 1–50 | Light brown | Colorless | None | None |
| 4 | 1–50 | Light brown | Colorless | None | Yes |
| 5 | 1–50 | Light brown | Colorless | Yes | None |
| 6 | 0.5–50 | Light brown | Colorless | None | None |
| 7 | 0.5–50 | Light brown | Colorless | None | None |
| 7 a | 5 | Light brown | Colorless | — | — |
| 8 | 0.5–50 | Light brown | Colorless | — | — |
| 9. | 2.5–50 | Light brown | Cloudy | Bitter | Taste lingers in the mouth |

Having thus described our invention, what we claim is:

1. A process for preparing a water-soluble artificial-sweetener composition, which process comprises:
   (a) dissolving about one part of water-insoluble 2,4,6,3'-tetrahydroxy-4'-methoxydihydrochalcone in from about 1 to 1000 parts by weight of a compound selected from the group consisting of an aliphatic polyol having four or more hydroxy groups, gelatin and gum arabic; and
   (b) heating the solution at a temperature of from about 30° C. to 180° C. to provide a water-soluble artificial-sweetener composition of enhanced sweetening power.

2. The process of claim 1 wherein the solution is heated to a temperature of from about 40° C. to 120° C.

3. The process of claim 1 wherein the polyol is selected from the group consisting of tetraglycerol, hexaglycerol, decaglycerol, sorbitol and combinations thereof.

4. The process of claim 1 which includes dissolving the 2,4,6,3'-tetrahydroxy-4'-methoxydihydrochalcone in ethanol and admixing the dihydrochalcone ethanol solution with the polyol compound, and which includes heating the solution to remove the ethanol.

5. The process of claim 1 which includes dissolving the water-soluble artificial-sweetener composition in water, drying the solution under vacuum and recovering a powdered artificial-sweetener composition.

6. The process of claim 1 wherein the heating takes place for a time period of from about 5 to 60 minutes.

7. The process of claim 1 wherein the amount ranges from about 5 to 500 parts by weight.

8. The artificial-sweetening composition produced by the process of claim 1.

9. A process for preparing an artificial-sweetener composition, which process comprises:
   (a) dissolving one part of 2,4,6,3'-tetrahydroxy-4'-methoxydihydrochalcone in from about 5 to 500 parts by weight of a $C_3$–$C_{100}$ aliphatic polyol compound having four or more hydroxy groups; and (b) heating the solution to a temperature of from about 40° C. to 120° C. for a period of time of from about 5 to 60 minutes, to provide a water-soluble artificial-sweetening composition.

10. The artificial-sweetening composition produced by the process of claim 9.

11. The process of claim 9 wherein the polyol is sorbitol.

12. An edible product which contains a sweetening amount of the artificial-sweetening composition as prepared in claim 9.

13. The process of claim 9 which includes dissolving the dihydrochalcone in ethanol prior to admixing with the polyol compound and heating the solution to remove the ethanol.

14. A process for preparing an artificial-sweetening composition, which process comprises:

(a) dissolving one part of 2,4,6,3'-tetrahydroxy-4'-methoxydihydrochalcone in from about 5 to 500 parts by weight of gelatin; and (b) heating the solution to a temperature of from about 40° C. to 120° C. for a period of time of from about 5 to 60 minutes, to provide a water-soluble artificial-sweetening composition.

15. The artificial-sweetening composition produced by the process of claim 14.

16. A process for preparing an artificial-sweetening composition, which process comprises:

(a) dissolving one part of 2,4,6,3'-tetrahydroxy-4'-methoxydihydrochalcone in from about 5 to 500 parts by weight of a water-soluble arabic gum; and (b) heating the solution to a temperature of from about 40° C. to 120° C. for a period of time of from about 5 to 60 minutes, to provide a water-soluble artificial-sweetening composition.

17. The artificial-sweetening composition produced by the process of claim 16.

* * * * *